(12) United States Patent
Lin

(10) Patent No.: US 11,315,336 B2
(45) Date of Patent: Apr. 26, 2022

(54) METHOD AND DEVICE FOR EDITING VIRTUAL SCENE, AND NON-TRANSITORY COMPUTER-READABLE STORAGE MEDIUM

(71) Applicant: BEIJING XIAOMI MOBILE SOFTWARE CO., LTD., Beijing (CN)

(72) Inventor: Xingsheng Lin, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/297,279

(22) Filed: Mar. 8, 2019

(65) Prior Publication Data
US 2019/0279432 A1 Sep. 12, 2019

(30) Foreign Application Priority Data
Mar. 9, 2018 (CN) .......................... 201810194295.9

(51) Int. Cl.
*G06T 7/70* (2017.01)
*G06T 19/00* (2011.01)
(Continued)

(52) U.S. Cl.
CPC .............. *G06T 19/20* (2013.01); *G06F 3/011* (2013.01); *G06F 3/0484* (2013.01); *G06T 7/70* (2017.01);
(Continued)

(58) Field of Classification Search
None
See application file for complete search history.

(56) References Cited

U.S. PATENT DOCUMENTS

2008/0071559 A1* 3/2008 Arrasvuori ............. G06Q 30/06
705/26.1
2014/0132484 A1* 5/2014 Pandey .................. G06T 11/60
345/8
(Continued)

FOREIGN PATENT DOCUMENTS

CN 107229393 A 10/2017
WO WO 2007/097644 A2 8/2007
(Continued)

OTHER PUBLICATIONS

Extended European Search Report dated Aug. 16, 2019 in corresponding European Patent Application No. 19158285.7, 8 pages
(Continued)

*Primary Examiner* — Kyle Zhai
(74) *Attorney, Agent, or Firm* — Oblon, McClelland, Maier & Neustadt, L.L.P.

(57) ABSTRACT

The present disclosure relates to a method and a device for editing a virtual scene, and a non-transitory computer-readable storage medium. The method includes determining a second location, in the virtual scene played on a terminal, corresponding to a first location of the terminal in a real space; generating one or more virtual objects editable within a predetermined range of the second location in the virtual scene; detecting an edit request for the virtual object; displaying an edit option in the virtual scene in response to the edit request; detecting an operation on the edit option; editing the virtual scene based on the operation on the edit option; and displaying the edited virtual scene.

15 Claims, 4 Drawing Sheets

(51) Int. Cl.
*G06T 19/20* (2011.01)
*G06F 3/0484* (2022.01)
*G06F 3/01* (2006.01)

(52) U.S. Cl.
CPC ........ *G06T 19/006* (2013.01); *G06T 2200/24* (2013.01); *G06T 2219/2004* (2013.01); *G06T 2219/2012* (2013.01); *G06T 2219/2016* (2013.01)

(56) References Cited

U.S. PATENT DOCUMENTS

| | | | |
|---|---|---|---|
| 2014/0225922 A1* | 8/2014 | Sbardella | G06T 19/20 |
| | | | 345/633 |
| 2014/0313228 A1 | 10/2014 | Kasahara | |
| 2017/0287218 A1 | 10/2017 | Nuernberger et al. | |
| 2018/0114365 A1* | 4/2018 | Egri | G06T 19/20 |

FOREIGN PATENT DOCUMENTS

| WO | WO 2013/118458 A1 | 8/2013 |
|---|---|---|
| WO | WO 2017/177019 A1 | 10/2017 |

OTHER PUBLICATIONS

Chinese Office Action dated Aug. 25, 2021 in Chinese Patent Application No. 201810194295.9, 5 pages \* cited by examiner

METHOD AND DEVICE FOR EDITING VIRTUAL SCENE, AND NON-TRANSITORY COMPUTER-READABLE STORAGE MEDIUM

CROSS-REFERENCE TO RELATED APPLICATIONS

This application is based upon and claims priority to Chinese Patent Application No. 201810194295.9, filed on Mar. 9, 2018, the entire contents of which are incorporated herein by reference.

TECHNICAL FIELD

The present disclosure relates to the technical field of augmented reality (AR), and in particular, to a method and a device for editing a virtual scene, and a non-transitory computer-readable storage medium.

BACKGROUND

Users can view a virtual scene in a real scene through an augmented reality (AR) device. Viewing the virtual scene in the real scene is a comparatively basic experience provided by the AR device for the users.

Users may edit the virtual scene on a device such as a computer in the real scene, which makes the user's operation experience unnatural.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for editing a virtual scene. The method includes determining a second location, in the virtual scene played on a terminal, corresponding to a first location of the terminal in a real space; generating one or more virtual objects editable within a predetermined range of the second location in the virtual scene; detecting an edit request for the virtual object; displaying an edit option in the virtual scene in response to the edit request; detecting an operation on the edit option; editing the virtual scene based on the operation on the edit option; and displaying the edited virtual scene.

According to an aspect, when determining the second location, the method further includes setting an anchor point of the virtual scene; and determining a location of the first location relative to the anchor point as the second location.

According to another aspect, the method further includes using a sensor to collect location information of the terminal in the real space; using a camera to capture an image of the real space; and determining the first location using a spatial location algorithm based on the location information and the image of the real space.

According to yet another aspect, when the edit option includes adding a virtual object, editing the virtual scene includes detecting a selection of the option of adding the virtual object, and adding a new virtual object into the virtual scene; when the edit option includes deleting a virtual object, editing the virtual scene includes detecting a selection of the option of deleting the virtual object, and deleting a selected virtual object in the virtual scene; and when the edit option includes modifying an object attribute, editing the virtual scene includes detecting a selection of the option of modifying the object attribute, and modifying an attribute of a selected virtual object in the virtual scene.

Aspects of the disclosure also provide a device for editing a virtual scene. The device includes a processor and a memory for storing instructions executable by the processor. The processor is configured to determine a second location, in the virtual scene played on a terminal, corresponding to a first location of the terminal in a real space; generate one or more virtual objects editable within a predetermined range of the second location in the virtual scene; detect an edit request for the virtual object; display an edit option in the virtual scene in response to the edit request; detect an operation on the edit option; edit the virtual scene based on the operation on the edit option; and display the edited virtual scene.

Aspects of the disclosure also provide a non-transitory computer-readable storage medium storing instructions that, when executed by one or more processors of a device, cause the device to determine a second location, in the virtual scene played on a terminal, corresponding to a first location of the terminal in a real space; generate one or more virtual objects editable within a predetermined range of the second location in the virtual scene; detect an edit request for the virtual object; display an edit option in the virtual scene in response to the edit request; detect an operation on the edit option; edit the virtual scene based on the operation on the edit option; and display the edited virtual scene.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims.

For convenience of explanation, some of the concepts related to the present disclosure will be described below firstly.

Augmented reality (AR) is also called mixed reality. It applies virtual information to the real world through computer technology. The real environment and virtual objects are superimposed onto the same image or space in real time so that they exist simultaneously. Augmented reality provides information that is different from human perception in a typical situation. It can not only display information of the real world, but also can display virtual information at the same time. The two kinds of information complement and superimpose with each other.

The aspects of the present disclosure are explained below in connection with the accompanying drawings.

Figure 1:
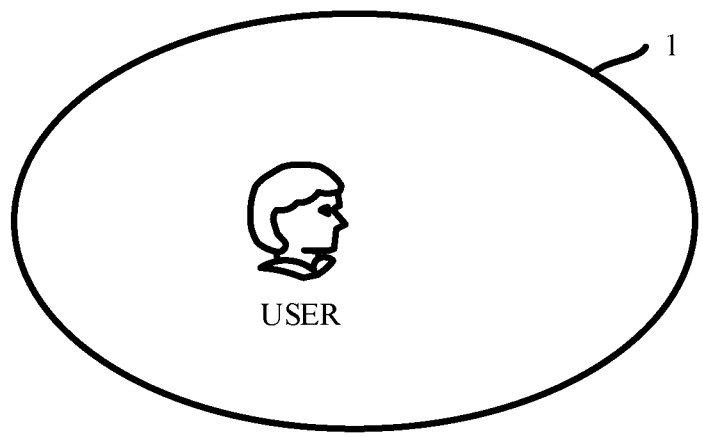
FIG. 1 is a schematic diagram illustrating an application scene of a method for editing a virtual scene according to an exemplary aspect of the present disclosure.

FIG. 1 is a schematic diagram illustrating an application scene of a method for editing a virtual scene according to an exemplary aspect.

As shown in FIG. 1, the user carries or wears a terminal and arrives at an environment 1, and then the terminal can perform the method of the aspect of the present disclosure. The terminal includes, but is not limited to, a handheld device, an in-vehicle device, a wearable device, a computing device, etc. The handheld device is, for example, a smart phone, a tablet computer, a personal digital assistant (PDA), and the wearable device is, for example, an AR glasses, an AR helmet, etc.

Figure 2:
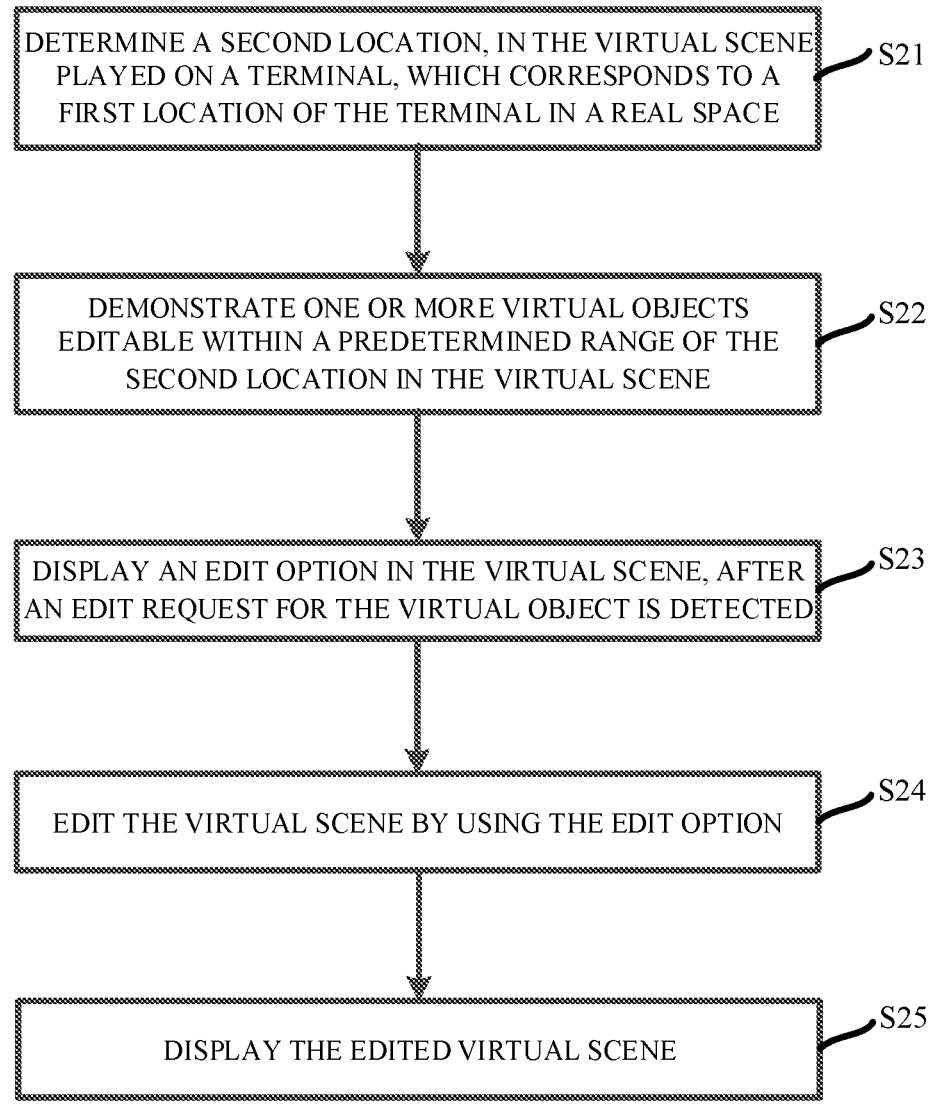
FIG. 2 is a flowchart of a method for editing a virtual scene according to an exemplary aspect of the present disclosure.

FIG. 2 is a flowchart of a method for editing a virtual scene according to an exemplary aspect, and the method can be applied to a terminal. As shown in FIG. 2, the method may include the following steps.

In step S21, a second location, in the virtual scene played on a terminal, which corresponds to a first location of the terminal in a real space is determined.

In this aspect, the virtual scene includes a virtual object image and/or a virtual character image. The virtual object image may be an image of an object other than the virtual characters in the virtual scene, such as a virtual person, a virtual animal, or the like. Each of the virtual object image and the virtual character image is a model in the virtual scene, and the model may be a 3D model.

According to an exemplary aspect, if the reality-based background image is a city building, the virtual object image may be an aircraft. If the reality-based background image is a stage picture, the virtual character image can be a sprite. If the reality-based background image is a classroom picture, the virtual object image may be a piano.

In one possible implementation, the first location of the terminal in the real space may be determined in the following way:

using a sensor to collect location information of the terminal in the real space, and using a camera to capture an image of the real space; and determining the first location using a spatial location algorithm based on the location information and the image of the real space.

In some aspects, the sensor can be built into the terminal. According to an exemplary aspect, the sensor can be a nine-axis sensor. The location information may include any one or more of an acceleration, an angular velocity and a geomagnetism. The camera can be built into the terminal, or the camera can be detachably connected to the terminal. The scene picture or the scene video of the surrounding real world (space) is captured by the camera, and the scene picture or the scene video is used as the image of the real space.

It should be noted that the camera captures the image of the real space in real time, and the image of the real space refers to the entire scene image that is captured by the camera and is what is sawn and got by the user, which is not a specific target in the image captured by the camera, i.e., not a specific target image. According to an exemplary aspect, the image of the real space captured by the camera is a bedroom, and the background image of the bedroom is the entire image that is captured and that the camera is currently facing.

In this aspect, the spatial location algorithm includes, but is not limited to, a simultaneous localization and mapping (SLAM) algorithm.

In one possible implementation, the second location can be determined in the following way:

setting an anchor point of the virtual scene; and determining a location of the first location relative to the anchor point as the second location.

In some aspects, in a typical situation, an object having a fixed location in the virtual scene is set as the anchor point. For example, if the reality-based background image is a bedroom picture, the anchor point may be a bed fixedly mounted at a certain location in the bedroom. After the anchor point of the virtual scene is set, the anchor point is used as a reference, and the second location is determined according to the location, as determined in real time, of the first location of the terminal in the real space relative to the location of the set anchor point.

In one possible implementation, a primary anchor point and a backup anchor point may be set in the virtual scene, and the primary anchor point is preferentially used. When the primary anchor point fails (for example, when the primary anchor point is deleted from the virtual scene), the backup anchor point is used. Of course, a plurality of anchor points can also be set in the virtual scene, and different priorities are set for the plurality of anchor points. The anchor point with the highest priority is preferentially used, and when the anchor point with the highest priority fails (for example, when the anchor with the highest priority is deleted from the virtual scene), an anchor with the highest priority among the anchors other than the anchor with the highest priority is used.

In step S22, one or more virtual objects editable within a predetermined range of the second location in the virtual scene is demonstrated.

In step S23, an edit option is displayed in the virtual scene, after an edit request for the virtual object is detected.

In some aspects, when the edit request includes an adding request of adding one or more virtual objects to the virtual scene, the edit option may include the option of adding a virtual object; when the edit request includes a deleting request of deleting one or more virtual objects from the virtual scene, the edit option may include the option of deleting a virtual object; and when the edit request includes a modifying request of modifying the attribute of one or more virtual objects in the virtual scene, the edit option may include the option of modifying the attribute of a virtual object.

In step S24, the virtual scene is edited by using the edit option.

In one possible implementation, when the edit option includes adding a virtual object, editing the virtual scene by using the edit option can be realized by selecting the option of adding a virtual object and by adding a new virtual object in the virtual scene.

In some aspects, if the edit option includes adding a virtual object, one or more new virtual objects are displayed in the virtual scene after the option of adding a virtual object is selected, and after the virtual objects to be added to the virtual scene are selected, the selected virtual objects are added to the virtual scene.

In one possible implementation, when the edit option includes deleting a virtual object, editing the virtual scene by using the edit option can be realized by selecting the option of deleting a virtual object and by deleting the selected virtual objects in the virtual scene.

In some aspects, if the edit option includes deleting a virtual object, one or more virtual objects are displayed in the virtual scene after the option of deleting a virtual object is selected, and after the virtual objects to be deleted from the virtual scene are selected, the selected virtual objects are deleted from the virtual scene.

In one possible implementation, when the edit option includes modifying the attribute of virtual object, editing the virtual scene by using the edit option can be realized by selecting the option of modifying the attribute of virtual object and by modifying the attributes of selected virtual objects in the virtual scene. The attribute of virtual object includes, but is not limited to, the color, size, location and rotation angle of the virtual object.

In some aspects, if the edit option includes modifying the attribute of virtual object, one or more virtual objects are displayed in the virtual scene after the option of modifying the attribute of virtual object is selected, and after the virtual objects whose attributes will be modified are selected, an option of attribute setting is displayed in the virtual scene, and the attributes of the selected virtual objects are modified according to a detected operation on the option of attribute setting.

According to an exemplary aspect, the option of attribute setting may include, but is not limited to, a zoom-out option for reducing the size of the virtual object, a zoom-in option for enlarging the size of the virtual object, a color adjustment option for adjusting the color of the virtual object, and a location adjustment option for adjusting the location of the virtual object.

In step S25, the edited virtual scene is displayed.

In the aspect of the present disclosure, when the terminal plays the virtual scene, the virtual scene can be edited according to the detected edit request, so that the user can edit the virtual scene while viewing it, which makes the user's operation experience more natural, thereby improving the user's experience on augmented reality devices.

Figure 3:
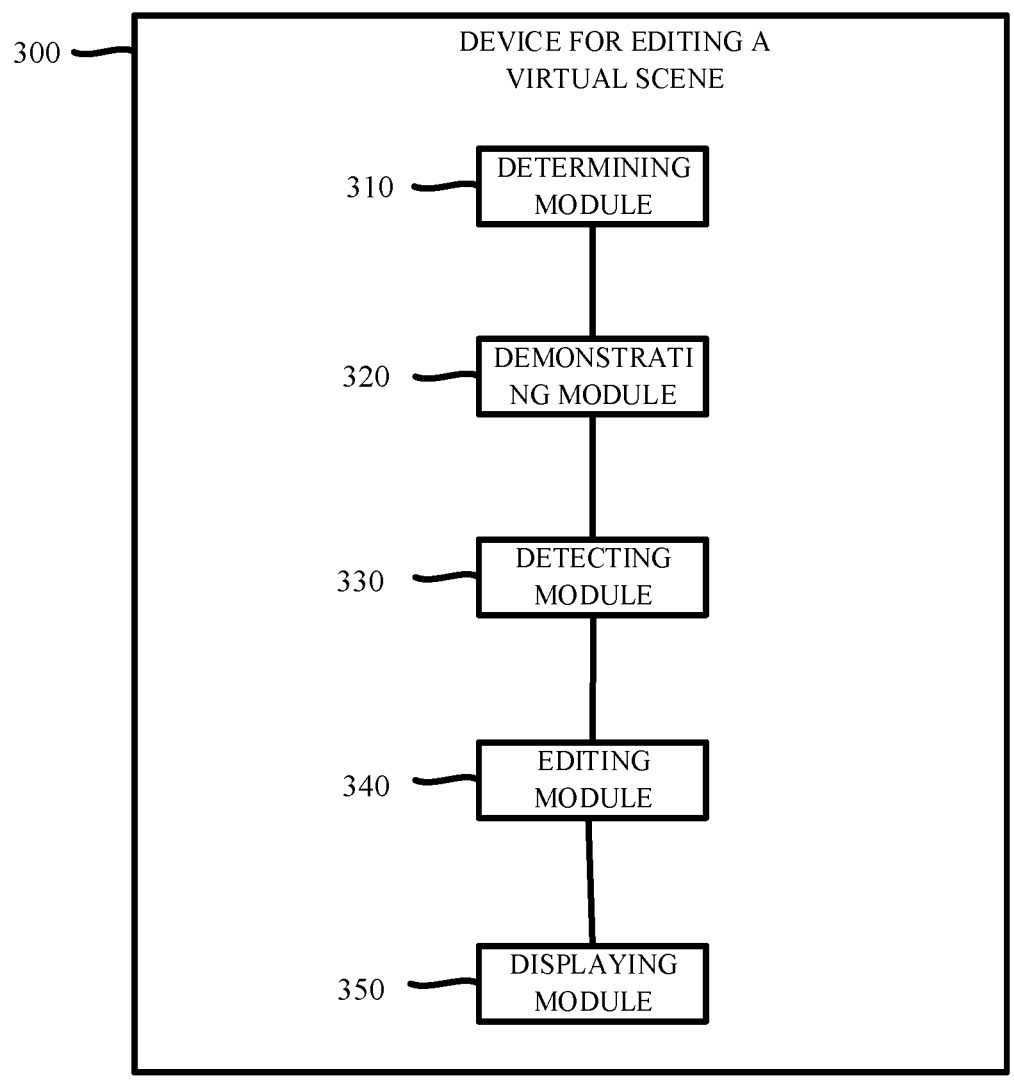
FIG. 3 is a block diagram of a device for editing a virtual scene according to an exemplary aspect of the present disclosure.

FIG. 3 is a block diagram of a device for editing a virtual scene according to an exemplary aspect, which can be applied to a terminal. With reference to FIG. 3, the editing device 300 may include a determining module 310, a demonstrating module 320, a detecting module 330, an editing module 340, and a displaying module 350.

The determining module 310 is configured to determine a second location, in the virtual scene played on a terminal, which corresponds to a first location of the terminal in a real space. The demonstrating module 320 is connected to the determining module 310, and is configured to demonstrate one or more virtual objects editable within a predetermined range of the second location in the virtual scene. The detecting module 330 is connected to the demonstrating module 320, and is configured to display an edit option in the virtual scene, after an edit request for the virtual object is detected. The editing module 340 is connected to the detecting module 330, and is configured to edit the virtual scene by using the edit option. The displaying module 350 is connected to the editing module 340, and is configured to display the edited virtual scene.

In one possible implementation, the determining module 310 may be configured to:
set an anchor point of the virtual scene; and
determine a location of the first location relative to the anchor point as the second location.

In one possible implementation, the determining module 310 may be configured to:
use a sensor to collect location information of the terminal in the real space, and use a camera to capture an image of the real space; and
determine the first location using a spatial location algorithm based on the location information and the image of the real space.

In one possible implementation,
when the edit option includes adding a virtual object, the editing module 340 may be configured to select the option of adding a virtual object, and add a new virtual object into the virtual scene;
when the edit option includes deleting a virtual object, the editing module 340 may be configured to select the option of deleting a virtual object, and delete a selected virtual object in the virtual scene; and
when the edit option includes modifying object attribute, the editing module 340 may be configured to select the option of modifying object attribute, and modify the attribute of a selected virtual object in the virtual scene.

In one possible implementation, the location parameter includes any one or more of an acceleration, an angular velocity and a geomagnetism.

For the device in the above aspect, the specific manners in which various modules operate have been described in detail in the aspect relating to the above method, and therefore will not be repeated herein.

Figure 4:
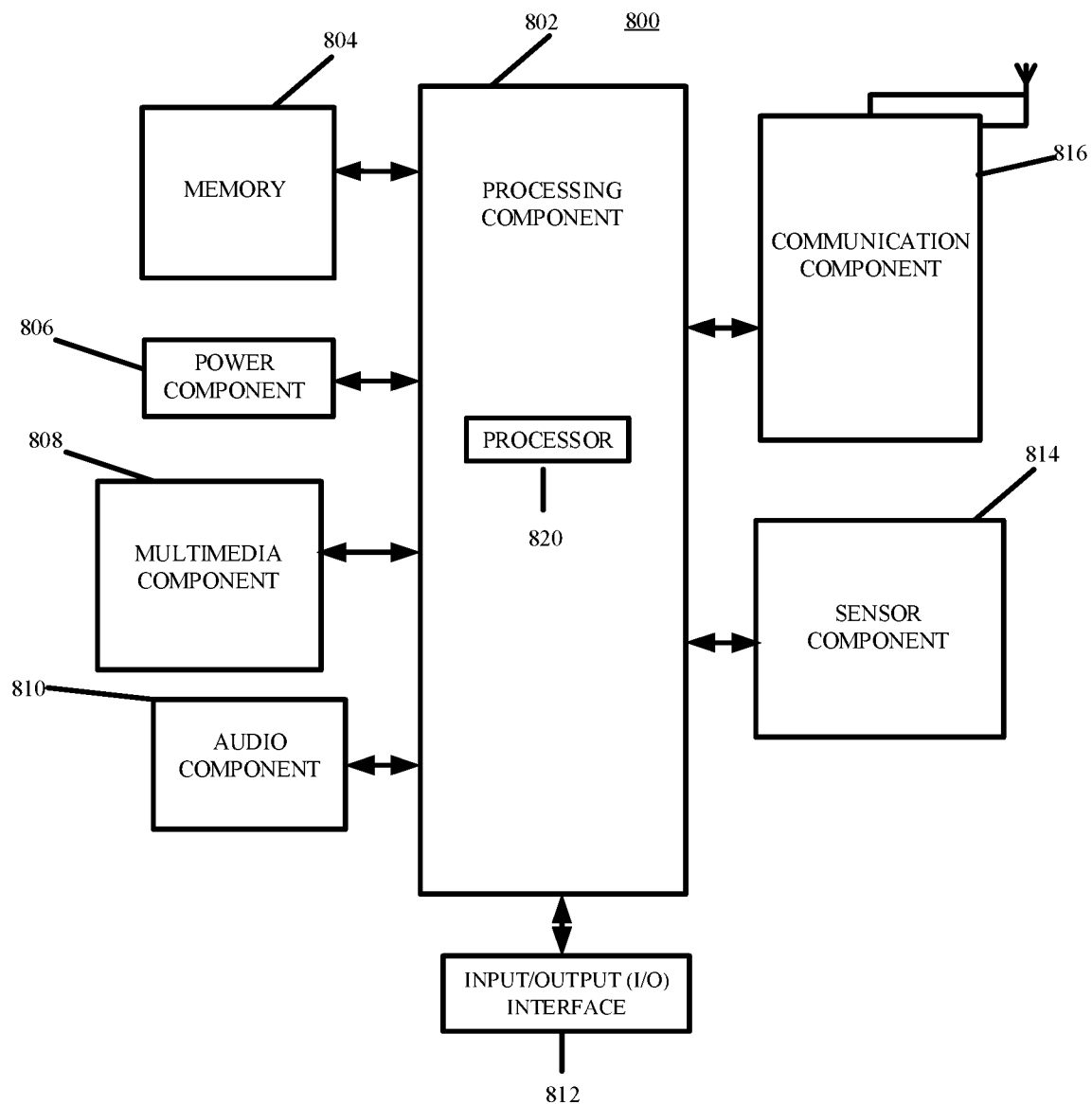
FIG. 4 is a block diagram illustrating the hardware structure of a device for editing a virtual scene according to an exemplary aspect of the present disclosure.

FIG. 4 is a block diagram illustrating the hardware structure of a device for editing a virtual scene according to an exemplary aspect. For example, the device 800 can be a mobile phone, a computer, a digital broadcast terminal, a messaging device, a game console, a tablet device, a medical device, a fitness device, a personal digital assistant, etc.

Referring to FIG. 4, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 808 includes a front camera and/or a rear camera. The front camera and/or the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some aspects, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some aspects, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof. In one exemplary aspect, the communication component 816 receives a broadcast signal or broadcast associated information from an external broadcast management system via a broadcast channel. In one exemplary aspect, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary aspects, there is also provided a non-transitory computer readable storage medium including instructions, such as the memory 804 including instructions, executable by the processor 820 in the device 800, for performing the above described method. For example, the non-transitory computer readable storage medium may be a ROM, a RAM, a CD-ROM, a magnetic tape, a floppy disc, an optical data storage device, and the like.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for editing a virtual scene, comprising:
   using a sensor to collect location information of a terminal in a real space;
   using a camera to capture an image of the real space; and
   determining a first location using a spatial location algorithm based on the location information and the image of the real space;
   determining a second location, in the virtual scene played on a terminal, corresponding to the first location of the terminal in the real space that is determined in real time, wherein determining the second location includes:

setting a plurality of anchor points having fixed locations in the virtual scene, wherein each of the plurality of anchor points in the virtual scene is assigned a different priority and corresponds to one of a plurality of locations in the real space; and using a first anchor point having a highest priority of the plurality of anchor points as a reference, determining a location of the first location in the real space relative to the first anchor point as the second location in the virtual scene;

generating one or more virtual objects editable within a predetermined range of the second location in the virtual scene;

detecting an edit request for the virtual object;

displaying an edit option in the virtual scene in response to the edit request;

detecting an operation on the edit option;

editing the virtual scene based on the operation on the edit option via a user's operation in a virtual space of the edit option; and displaying the edited virtual scene, wherein while the virtual scene is played on the terminal, the virtual scene can be edited according to the detected editing request, so that the user can edit the virtual scene while watching the virtual scene.

2. The method according to claim 1, wherein:

when the edit option includes adding a virtual object, editing the virtual scene includes detecting a selection of the option of adding the virtual object, and adding a new virtual object into the virtual scene;

when the edit option includes deleting a virtual object, editing the virtual scene includes detecting a selection of the option of deleting the virtual object, and deleting a selected virtual object in the virtual scene; and when the edit option includes modifying an object attribute, editing the virtual scene includes detecting a selection of the option of modifying the object attribute, and modifying an attribute of a selected virtual object in the virtual scene.

3. The method according to claim 1, wherein:

when the edit option includes adding a virtual object, editing the virtual scene includes detecting a selection of the option of adding the virtual object, and adding a new virtual object into the virtual scene;

when the edit option includes deleting a virtual object, editing the virtual scene includes detecting a selection of the option of deleting the virtual object, and deleting a selected virtual object in the virtual scene; and when the edit option includes modifying an object attribute, editing the virtual scene includes detecting a selection of the option of modifying the object attribute, and modifying an attribute of a selected virtual object in the virtual scene.

4. The method according to claim 1, wherein:

when the edit option includes adding a virtual object, editing the virtual scene includes detecting a selection of the option of adding the virtual object, and adding a new virtual object into the virtual scene;

when the edit option includes deleting a virtual object, editing the virtual scene includes detecting a selection of the option of deleting the virtual object, and deleting a selected virtual object in the virtual scene; and when the edit option includes modifying an object attribute, editing the virtual scene includes detecting a selection of the option of modifying the object attribute, and modifying an attribute of a selected virtual object in the virtual scene.

5. The method according to claim 1, wherein the location information includes at least one of an acceleration, an angular velocity, and/or a geomagnetism.

6. The method according to claim 1, further comprising:

determining that the first anchor point has failed; and setting a second anchor point having a priority that is less than the first anchor point as a primary anchor point for generating the one or more virtual objects editable within the predetermined range of the second location in the virtual scene.

7. A device for editing a virtual scene, comprising:

a processor; and a memory for storing instructions executable by the processor, wherein the processor is configured to:

use a sensor to collect location information of a terminal in a real space;

use a camera to capture an image of the real space; and determine a first location using a spatial location algorithm based on the location information and the image of the real space;

determine a second location, in the virtual scene played on a terminal, corresponding to the first location of the terminal in the real space that is determined in real time, wherein, when determining the second location, the processor is further configured to:

set a plurality of anchor points having fixed locations in the virtual scene, wherein each of the plurality of anchor points in the virtual scene is assigned a different priority and corresponds to one of a plurality of locations in the real space; and using a first anchor point having a highest priority of the plurality of anchor points as a reference, determine a location of the first location in the real space relative to the first anchor point as the second location in the virtual scene;

generate one or more virtual objects editable within a predetermined range of the second location in the virtual scene;

detect an edit request for the virtual object;

display an edit option in the virtual scene in response to the edit request;

detect an operation on the edit option;

edit the virtual scene based on the operation on the edit option via a user's operation in a virtual space of the edit option; and display the edited virtual scene, wherein while the virtual scene is played on the terminal, the virtual scene can be edited according to the detected editing request, so that the user can edit the virtual scene while watching the virtual scene.

8. The device for editing a virtual scene according to claim 7, wherein:

when the edit option includes adding a virtual object, the processor is further configured to edit the virtual scene by detecting a selection of the option of adding the virtual object, and adding a new virtual object into the virtual scene;

when the edit option includes deleting a virtual object, the processor is further configured to edit the virtual scene by detecting a selection of the option of deleting the virtual object, and deleting a selected virtual object in the virtual scene; and when the edit option includes modifying an object attribute; the processor is further configured to edit the virtual scene by detecting a selection of the option of modifying the object attribute, and modifying an attribute of a selected virtual object in the virtual scene.

9. The device for editing a virtual scene according to claim 7, wherein:
when the edit option includes adding a virtual object, the processor is further configured to edit the virtual scene by detecting a selection of the option of adding the virtual object, and adding a new virtual object into the virtual scene;
when the edit option includes deleting a virtual object, the processor is further configured to edit the virtual scene by detecting a selection of the option of deleting the virtual object, and deleting a selected virtual object in the virtual scene; and
when the edit option includes modifying an object attribute, the processor is further configured to edit the virtual scene by detecting a selection of the option of modifying the object attribute, and modifying an attribute of a selected virtual object in the virtual scene.

10. The device for editing a virtual scene according to claim 7, wherein:
when the edit option includes adding a virtual object, the processor is further configured to edit the virtual scene by detecting a selection of the option of adding the virtual object, and adding a new virtual object into the virtual scene;
when the edit option includes deleting a virtual object, the processor is further configured to edit the virtual scene by detecting a selection of the option of deleting the virtual object, and deleting a selected virtual object in the virtual scene; and
when the edit option includes modifying an object attribute; the processor is further configured to edit the virtual scene by detecting a selection of the option of modifying the object attribute, and modifying an attribute of a selected virtual object in the virtual scene.

11. The device for editing a virtual scene according to claim 7, wherein the location information includes at least one of an acceleration, an angular velocity, and/or a geomagnetism.

12. A non-transitory computer-readable storage medium storing instructions that, when executed by one or more processors of a device, cause the device to:
use a sensor to collect location information of a terminal in a real space;
use a camera to capture an image of the real space; and
determine a first location using a spatial location algorithm based on the location information and the image of the real space;
determine a second location, in the virtual scene played on a terminal, corresponding to the first location of the terminal in the real space that is determined in real time, wherein, when determining the second location, the instructions further cause the device to:
set a plurality of anchor points having fixed locations in the virtual scene, wherein each the plurality of anchor points in the virtual scene is assigned a different priority and corresponds to one of a plurality of locations in the real space; and
using a first anchor point having a highest priority of the plurality of anchor points as a reference, determine a location of the first location in the real space relative to the first anchor point as the second location in the virtual scene;
generate one or more virtual objects editable within a predetermined range of the second location in the virtual scene;

detect an edit request for the virtual object;
display an edit option in the virtual scene in response to the edit request;
detect an operation on the edit option;
edit the virtual scene based on the operation on the edit option via a user's operation in a virtual space of the edit option; and
display the edited virtual scene,
wherein while the virtual scene is played on the terminal, the virtual scene can be edited according to the detected editing request, so that the user can edit the virtual scene while watching the virtual scene.

13. The non-transitory computer-readable storage medium according to claim 12, wherein:
when the edit option includes adding a virtual object, the instructions further cause the device to edit the virtual scene by detecting a selection of the option of adding the virtual object, and adding a new virtual object into the virtual scene;
when the edit option includes deleting a virtual object, the instructions further cause the device to edit the virtual scene by detecting a selection of the option of deleting the virtual object, and deleting a selected virtual object in the virtual scene; and
when the edit option includes modifying an object attribute, the instructions further cause the device to edit the virtual scene by detecting a selection of the option of modifying the object attribute, and modifying an attribute of a selected virtual object in the virtual scene.

14. The non-transitory computer-readable storage medium according to claim 12, wherein:
when the edit option includes adding a virtual object, the instructions further cause the device to edit the virtual scene by detecting a selection of the option of adding the virtual object, and adding a new virtual object into the virtual scene;
when the edit option includes deleting a virtual object, the instructions further cause the device to edit the virtual scene by detecting a selection of the option of deleting the virtual object, and deleting a selected virtual object in the virtual scene; and
when the edit option includes modifying an object attribute, the instructions further cause the device to edit the virtual scene by detecting a selection of the option of modifying the object attribute, and modifying an attribute of a selected virtual object in the virtual scene.

15. The non-transitory computer-readable storage medium according to claim 12, wherein:
when the edit option includes adding a virtual object, the instructions further cause the device to edit the virtual scene by detecting a selection of the option of adding the virtual object, and adding a new virtual object into the virtual scene;
when the edit option includes deleting a virtual object, the instructions further cause the device to edit the virtual scene by detecting; a selection of the option of deleting the virtual object, and deleting a selected virtual object in the virtual scene; and
when the edit option includes modifying an object attribute, the instructions further cause the device to edit the virtual scene by detecting a selection of the option of modifying the object attribute, and modifying an attribute of a selected virtual object in the virtual scene.

* * * * *